US006680031B2

(12) United States Patent
Bisgrove et al.

(10) Patent No.: US 6,680,031 B2
(45) Date of Patent: Jan. 20, 2004

(54) SPRAY GUN WITH A PLURALITY OF SINGLE NOZZLES FOR A FLUID BED PROCESSING SYSTEM AND METHOD THEREOF

(75) Inventors: Bruce A. Bisgrove, Ontario, NY (US); Ryszard Braun, Rochester, NY (US); Robert I. Christensen, Jr., Pinole, CA (US); Robert C. Fewkes, Webster, NY (US); Alfred L. Gaertner, San Bruno, CA (US); John Reynold, Cedar Rapids, IA (US); David R. Wight, Rochester, NY (US); Antti Kosola, Kirkonummi (FI)

(73) Assignee: Genencor International, Inc., Palo Alto, CA (US)

( * ) Notice: Subject to any disclaimer, the term of this patent is extended or adjusted under 35 U.S.C. 154(b) by 39 days.

(21) Appl. No.: 09/219,275

(22) Filed: Dec. 22, 1998

(65) Prior Publication Data

US 2001/0009648 A1 Jul. 26, 2001

(51) Int. Cl.[7] ............................. B05B 7/08; B01J 8/18
(52) U.S. Cl. ..................... 422/145; 422/139; 422/140; 422/143; 118/303; 118/315; 239/549
(58) Field of Search ................... 422/139, 140, 422/145, 143; 159/4.01, 4.04, DIG. 5; 118/303, DIG. 5, 315; 239/549; 34/585; 427/213, 2.15, 2.18

(56) References Cited

U.S. PATENT DOCUMENTS

| 3,390,648 | A | * | 7/1968 | Martin | 427/2.18 |
|---|---|---|---|---|---|
| 3,622,081 | A |  | 11/1971 | Marsh | 239/427.3 |
| 4,021,193 | A | * | 5/1977 | Waters | 432/58 |
| 4,319,717 | A |  | 3/1982 | Hofmann | 239/654 |
| 4,407,844 | A | * | 10/1983 | Melliger | 427/2.18 |
| 4,533,367 | A | * | 8/1985 | Hadzismajlovic | 55/91 |
| 4,564,280 | A | * | 1/1986 | Fukuda | 396/611 |
| 4,895,733 | A | * | 1/1990 | Imanidis et al. | 427/8 |
| 4,963,226 | A | * | 10/1990 | Chamerlain | 159/48.1 |
| 5,009,508 | A |  | 4/1991 | Wojdylo | 366/10 |
| 5,032,222 | A |  | 7/1991 | Millioud | 159/4.1 |
| 5,571,562 | A | * | 11/1996 | Wakat | 427/280 |
| 5,589,225 | A | * | 12/1996 | Yamada et al. | 427/212 |
| 5,660,466 | A |  | 8/1997 | Hopson et al. | 366/137.1 |
| 5,693,362 | A | * | 12/1997 | Boos et al. | 427/10 |
| 5,722,802 | A |  | 3/1998 | March | 406/46 |
| 5,904,301 | A | * | 5/1999 | Kajiyama et al. | 239/549 |

FOREIGN PATENT DOCUMENTS

| JP | 55143310 | 11/1980 |
|---|---|---|
| JP | 62160124 | 7/1987 |
| JP | 01085126 | 3/1989 |
| JP | 07148410 | 6/1995 |

OTHER PUBLICATIONS

*Fluid Bed Systems*, 4 page brochure with 1 page supplement entitled, *Chadelier Spray System*, from Fluid Air, Inc., Naperville, Illinois, (1991).

* cited by examiner

*Primary Examiner*—Jerry D. Johnson
*Assistant Examiner*—Alexa A. Doroshenk
(74) *Attorney, Agent, or Firm*—Kilyk & Bowersox, P.L.L.C.

(57) ABSTRACT

A fluid bed processing system with a spraying apparatus in accordance with one embodiment of the present invention includes an expansion chamber and at least one spraying apparatus which extends into the expansion chamber. The spraying apparatus has a plurality of single nozzles which are spaced along the spraying apparatus and has at least one fluid passage connected to each of the single nozzles.

18 Claims, 4 Drawing Sheets

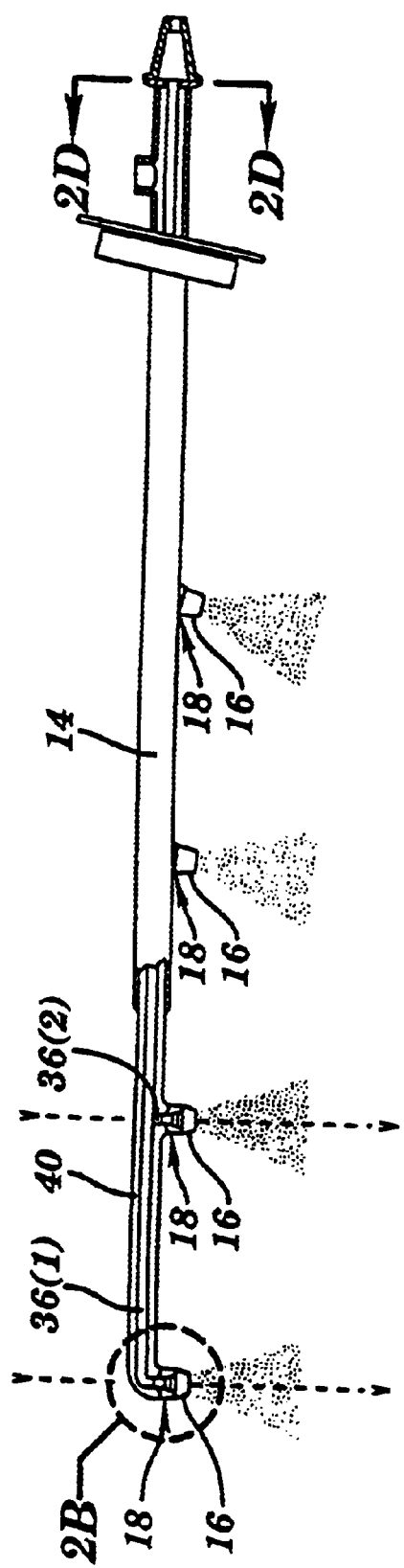
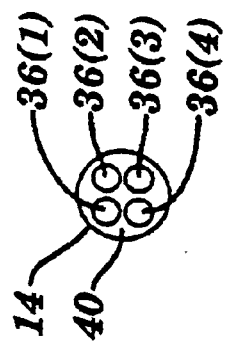
FIG. 2A
FIG. 2D

SPRAY GUN WITH A PLURALITY OF SINGLE NOZZLES FOR A FLUID BED PROCESSING SYSTEM AND METHOD THEREOF

FIELD OF THE INVENTION

This invention relates generally to a fluid bed processing system and, more particularly, to a spray gun with a plurality of single nozzles for a fluid bed processing system and a method thereof.

BACKGROUND OF THE INVENTION

Fluid bed processing systems and methods can be used in a variety of different applications. For example, fluid bed processing systems and methods can be used to dry wet particles for further processing or discharge. Fluid bed processing systems and methods can also be used to coat particles by building identifiable layers evenly over an identified core. Further, fluid bed processing systems and methods can be used to granulate particles into larger aggregates in which the original particles can still be identified in the aggregates.

In fluid bed processing systems and methods, particles to be processed are loaded into a product chamber and are then fluidized into an expansion chamber. If the particles are going to be coated or granulated, a solution is sprayed onto the particles. With the solution, either layers are coated on the particles or the particles begin to aggregate together to form larger particles. The particles dry as they descend down in the expansion chamber and then are blown back up. This up and down process continues until the processing is completed and then the particles are discharged from the product chamber.

In prior fluid bed processing systems and methods, the solution is sprayed out using spray guns which have groups or sets of nozzles, typically groups of three. The nozzles are angled away from each other and away from vertical to achieve a desired spray pattern. Typically, the spray nozzles in each group are positioned between about ten and eighty degrees away from vertical.

One of the problems with these spray guns is that the groups of nozzles have to be spaced apart from each other and from the side wall of the expansion chamber to avoid having their sprays overlap across the expansion chamber. Unfortunately, the spacing needed between groups of nozzles to avoid overlapping sprays reduces the overall spray rate which reduces the overall production throughput of the fluid bed processing system.

Another problem with these spray guns is that the nozzles in each set or group are fed from the same feed stream and thus can not be controlled individually. As a result, the spray rate from one or more of the nozzles may not be set at an optimum level.

Yet another problem with these spray guns is that the mountings for the groups of nozzles are complicated to install and expensive because of the large numbers of parts needed. Because of the additional parts, the mountings are also more likely to need service and/or replacement.

SUMMARY OF THE INVENTION

A fluid bed processing system with a spraying apparatus in accordance with one embodiment of the present invention includes an expansion chamber and at least one spraying apparatus which extends into the expansion chamber. The spraying apparatus has a plurality of single nozzles which are spaced along the spraying apparatus. The spraying apparatus also has at least one fluid passage connected to the single nozzles. Each of the single nozzles on the spraying apparatus is positioned to spray fluid in a direction to avoid substantial interaction with spray from the other single nozzles.

A fluid bed processing system with a spraying apparatus in accordance with another embodiment of the present invention also includes an expansion chamber and at least one spraying apparatus which extends into the expansion chamber. The spraying apparatus includes a plurality of fluid passages which extend along at least a portion of the spraying apparatus and a plurality of single nozzles which are spaced along the spray gun and are connected to a different one of the fluid passages.

A method in accordance with another embodiment of the present invention includes loading material to be formed into the particles into a product chamber, fluidizing at least a portion of the material up into an expansion chamber from the product chamber, and spraying a fluid from a plurality of single nozzles in a spray apparatus onto the fluidized powder in directions chosen to avoid substantial interaction between the sprays from each nozzle.

A method for forming enlarged particles from a powder in a fluid bed processing system in accordance with another embodiment of the present invention includes loading material to be formed into larger particles into a product chamber, fluidizing at least a portion of the material up into an expansion chamber from the product chamber, supplying a fluid separately to each of a plurality of single nozzles on a spraying apparatus, and spraying the fluid onto the fluidized material.

With the fluid bed processing system with the spraying apparatus in accordance with the present invention more single nozzles can be deployed in a given cross-sectional area than with prior systems and consequently higher spray rates can be achieved. As a result, the overall production throughput of the fluid bed processing system is increased.

Additionally, with the present invention better control over the direction of spray can be achieved than with prior systems. For example, with the present invention the single nozzles can be positioned closer together and closer to the wall than was possible with prior systems with groups or sets of nozzles.

Further, with single nozzles, the nozzle mountings have been significantly simplified making the single nozzles easier to install and service.

BRIEF DESCRIPTION OF THE DRAWINGS

FIG. 2A is a partial side and partial cross-sectional view of the spray apparatus;

FIG. 2D is a cross-sectional view of the spray apparatus taken along lines 2D—2D in FIG. 2A;

DETAILED DESCRIPTION

Figure 1:
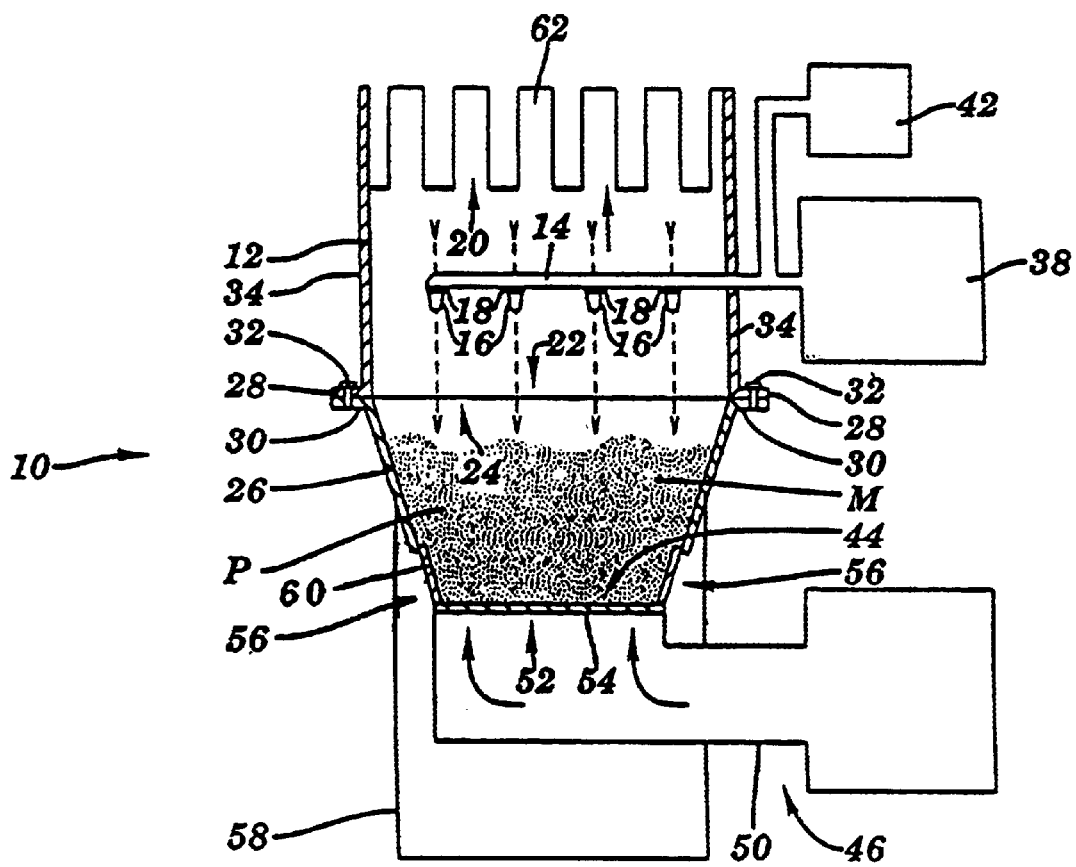
FIG. 1 is a cross-sectional view of a fluid bed processing system with a spraying apparatus in accordance with one embodiment of the present invention.

A fluid bed processing system 10, such as a coater, granulator, or dryer, in accordance with one embodiment of the present invention is illustrated in FIG. 1. The fluid bed processing system 10 includes an expansion chamber 12 and at least one spray apparatus 14 with a plurality of single nozzles 16. The present invention provides a number of advantages including permitting more single nozzles 16 to be deployed in a given cross-sectional area, providing better control over the direction of spray than was possible with prior systems, and providing more simplified nozzle mountings 18 than was found in prior systems.

Referring to FIG. 1, the expansion chamber 12 has an open top 20 and an open bottom 22 which is connected to an open top 24 of the product chamber 26. In this particular embodiment the expansion chamber 12 has a cylindrical shape, although the shape can vary as needed or desired. The expansion chamber 12 receives the fluidized particles P blown up from the product chamber 26. In this particular embodiment, the expansion chamber 12 has a flange 28 which extends around the expansion chamber 12 and is secured to a flange 30 of a product chamber 26 located below the expansion chamber 12 with bolts 32 or other securing devices, although other ways to connect the expansion chamber 12 to the product chamber 26 could be used.

Referring to FIGS. 1 and 2A, the spraying apparatus 14 extends into the expansion chamber 12. In this particular embodiment the spraying apparatus 14 has a substantially straight and elongated or wand shape, although the spraying apparatus 14 could have other shapes as needed or desired. Although in the particular embodiment shown in FIG. 1 the fluid bed processing system 10 has one spraying apparatus 14 the fluid bed processing system 10 may have more than one spraying apparatus 14. For example, as shown in one embodiment in FIG. 3A the fluid bed processing system 10 has three spraying apparatuses 14 and as shown in another embodiment in FIG. 3B the fluid bed processing system 10 has eight spraying apparatuses 14. The particular arrangement of the spraying apparatuses 14 in the expansion chamber 12 can also vary as needed or desired. For example, as shown in FIG. 3A the spraying apparatuses 14 are arranged in an overlapping arrangement while in FIG. 3B the spraying apparatuses 14 extend into the expansion chamber 12 without overlapping. As these examples, illustrate, the spray apparatuses 14 and single nozzles 16 can be positioned about the expansion chamber 12 to uniformly spray fluid onto the fluidized particles P without any significant spraying overlap.

Figure 2B:
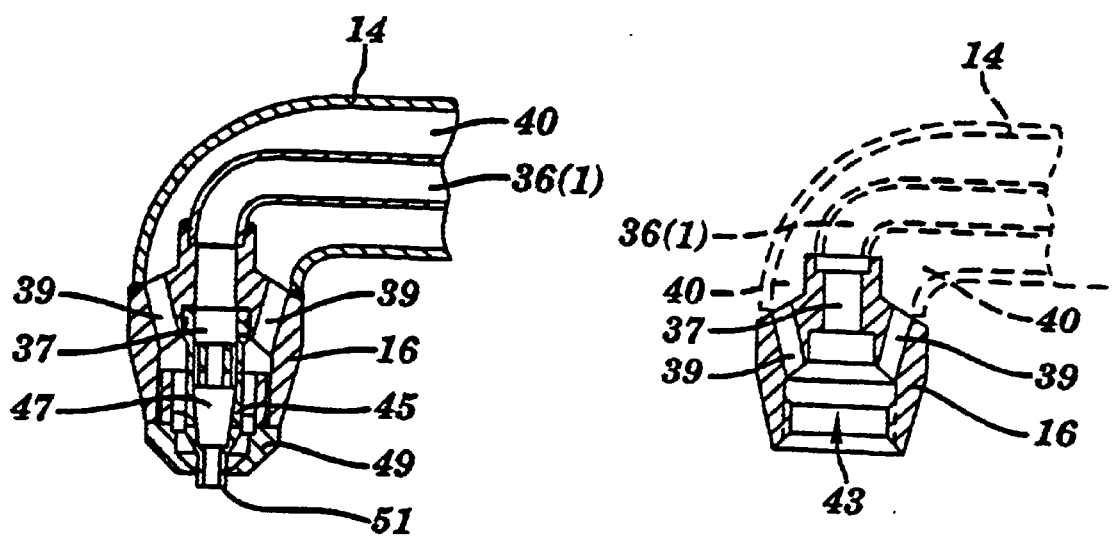
FIG. 2B is an enlarged view of a portion of the spray apparatus and one spray nozzle.

Referring to FIGS. 1 and 2A–2C, each spraying apparatus 14 has a plurality of single nozzles 16 which are spread along its length. Although in the particular embodiments illustrated in FIGS. 1, 3A, and 3B, the spraying apparatuses 14 have either two or four single nozzles 16, the number of single nozzles 16 can vary as needed or desired. The single nozzles 16 are mounted on each of the spraying apparatuses 14 to spray fluid or binder solution back down towards product chamber 26. In this particular embodiment, the single nozzles 16 are mounted so that the center of the spray is directed in a substantially vertical direction along an axis V—V as shown in FIGS. 1 and 2A. However, the single nozzles 16 can be adjusted to spray at any desired angle with respect to vertical shown by axis V—V. One of the advantages of the present invention is that by using single nozzles 16 instead of groups of nozzles, the single nozzles 16 can be spaced closely to each other and also to the side wall 34 or walls of the expansion chamber 12 so that a substantial portion of the cross-sectional area of the expansion chamber 12 can be sprayed with little if any overlap of the spray between single nozzles 16. The increased coverage along with the higher spray rates which can be used because of the substantially vertical direction for the spray from each single nozzle 16 helps to increase the overall production throughput of the granulator 10.

Figure 2C:
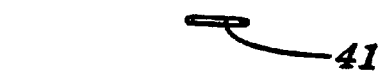
FIG. 2C is an exploded view of the portion of the spray apparatus and the spray nozzle shown in FIG. 2B.
Figure 2C:
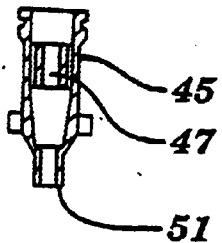
Figure 2C:
Figure 2C:
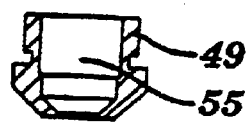
Figure 2C:
Figure 3B:
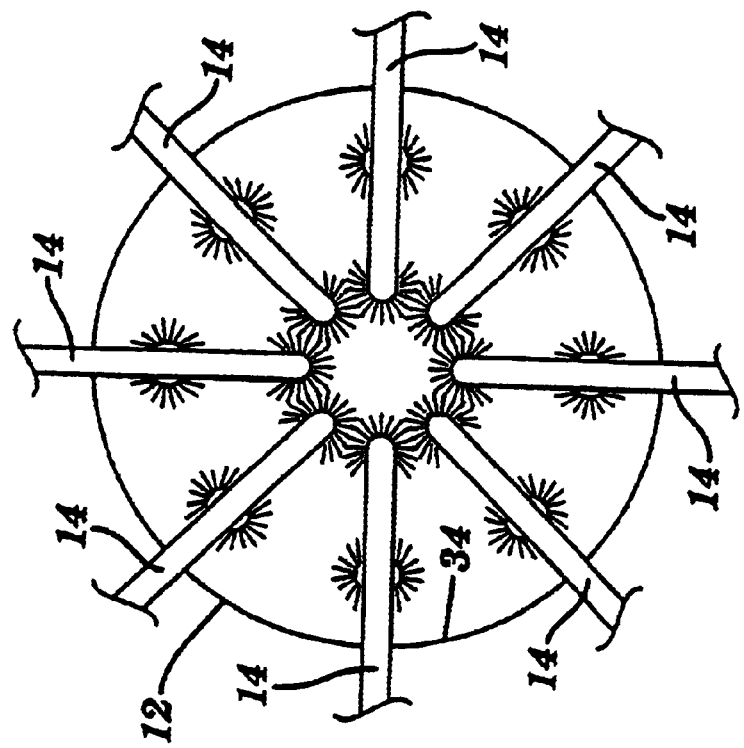
FIG. 3B is a cross-sectional view of an expansion chamber illustrating another possible configuration for the spray apparatuses.
Figure 3A:
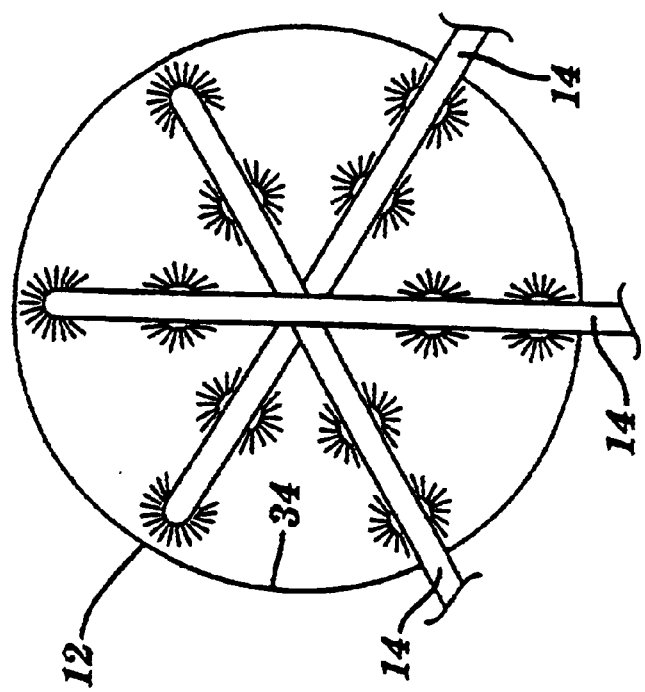
FIG. 3A is a cross-sectional view of an expansion chamber illustrating one possible configuration for the spray apparatuses.

Referring to FIGS. 2B and 2C, a portion of the spray apparatus 14 and one of the single nozzles 16 is illustrated. In this particular embodiment, the single nozzle 16 is mounted in to the spray apparatus 14 with welds so that a passage 37 in the single nozzle 16 is connected to fluid passage 36(1) and passages 39 are connected to a gas passage 40. A liquid insert 45 with a passage 47 is inserted in the opening 43 in the single nozzle 16 so that passage 47 is in communication with passage 37. An optional O-ring 41 is inserted in the opening 43 between the single nozzle 16 and the liquid insert 45 to help form a seal. In this particular embodiment, the liquid insert 45 is held in place in the opening 43 in the single nozzle 16 by welds. An air cap 49 is seated over the liquid insert 45 and partially in opening 43 of single nozzle 16. In this particular embodiment, the air cap 49 is held in place in the opening 43 in the single nozzle 16 by welds. Another optional O-ring 53 is inserted in the opening 43 between single nozzle 16 and the air cap 49. The air cap 49 has a passage 55 which funnels air from passages 40 and 39 around end 51 of the liquid insert 45 to help create the spray from the single nozzle 16. Although welds are shown to mount the various components discussed above, other types of mounting techniques, such as adhesives, bolts, or mating threads, can also be used. As illustrated, the single nozzles 16 have a simpler design than prior nozzles making the single nozzles 16 easier to install or replace.

Referring to FIGS. 1 and 2A–2D, the spraying apparatus 14 in this particular embodiment includes a plurality of fluid passages 36(1)–36(4) which extend along at least a portion of the length of the spraying apparatus 14. Each of the single nozzles 16 is connected to one end of one of the fluid passages 36(1)–36(4) the other end of the fluid passages 36(1)–36(4) is connected to a source of fluid 38 or binder solution, such as water or an organic solvent in this particular embodiment. With individual fluid passages 36(1)–36(4) connected to each single nozzle 16 the amount of fluid and thus the spray rate can be controlled individually at each single nozzle 16. As a result, the spray rate from each single nozzle 16 can be set at an optimum setting for the particular application. The rate of fluid flow from each single nozzle 16 can be controlled with a valve (not shown) in each fluid passage 36(1)–36(4). The amount each valve is opened can be used to control the amount of fluid which is fed to each single nozzle 16. The spraying apparatus 14 may also include gas passage 40 which is connected to each of the single nozzles 16 and also to a source of gas 42, such as air. The fluid and the gas are fed to each single nozzle 16.

Referring to FIG. 1, the product chamber 26 also has an open bottom 44. The product chamber is used to retain the particles P in the fluid bed processing system 10. In this particular embodiment, the product chamber 26 has a funnel shape which slopes down and inward from the open top 24, although the product chamber 26 could have other shapes, such as a partial pyramid shape and could be straight or sloped in other directions from the open top 24 to open bottom 44 as needed or desired.

The fluid bed processing system 10 also includes a fluid supply system 46 with a blower 48 and a duct 50 with an outlet 52 which is positioned to direct fluid into the product chamber 26 through the open bottom 44 in the direction shown by the arrows in FIG. 1. In this particular embodiment, a screen 54 is connected to the duct 50 across the outlet 52, although the screen 54 could be connected elsewhere, such as to the product chamber 26 across the open bottom 44. The screen 54 has a suitable mesh size to support particles P. The fluid supply system 46 may also include a heater (not shown) which is used to heat the fluid to a suitable temperature for fluid bed processing of the particles P. In this particular embodiment, the fluid being supplied by the fluid supply system 46 is air, although other types of fluid can be used as needed or desired.

A discharge opening 56 is defined between and extending substantially around the outlet 52 of the duct 50 for the fluid supply system 46 and the open bottom 44 of the product chamber 26. The discharge opening 56 provides a passage for particles P to be rapidly discharged from the product chamber 26. Although in this particular embodiment, the discharge opening 56 is located between the outlet 52 of the duct 50 and the open bottom 44 of product chamber 26, the discharge opening 56 could be located elsewhere, such as in the product chamber 26 adjacent the open bottom 44.

A collection chamber 58 is connected to the product chamber 26 and is located about the discharge opening 56. The collection chamber 58 receives the particles P from the product chamber 26 when the discharge opening 56 is exposed or open.

A side discharge mechanism 60 is mounted to the interior of the product chamber 26 with a mounting structure (not shown) and can be moved within the mounting structure to a first position covering the discharge opening 56, to a second position exposing the discharge opening 56, and to intermediate positions which partially expose the discharge opening 56 and permit the rate of discharge to be controlled. Although in this particular embodiment the side discharge mechanism 60 is located on the inside of the product chamber 26, the side discharge mechanism 60 can be mounted at other locations, such as to the outside of the product chamber 26, as long as the side discharge mechanism 60 can be moved to the first, second and intermediate positions.

The fluid bed processing system 10 may also include a filter 62 connected across the open top 20 of the expansion chamber 12. The filter 62 removes fluidized particles P in the air before the air is discharged from the open top 20 of the expansion chamber 12. An agitating mechanism (not shown) may be connected to the filter 62 to periodically shake the filter 62 to discharge captured particles P back down towards the expansion chamber 12 and product chamber 26.

One method for fluid bed processing of particles P will be discussed with reference to FIGS. 1 and 2A–2D. First, the side discharge mechanism 60 is moved to the first position to cover the discharge opening 56. Next, particles P to be processed, such as a powder comprising single or multiple components, is loaded into the product chamber 26.

Once the particles P are loaded into the product chamber 26, the fluid supply system 46 is engaged to supply a fluid, such as air in this particular example, via the duct 50 to the particles P. The air being blown in helps to mix the particles P and enables some of the particles P to fluidize up into the expansion chamber 12. Meanwhile, the heater heats the fluid being blown in to a temperature suitable for the particular fluid bed processing application, such as a coating or an agglomeration process.

Next in this particular example, the spray apparatus 14 in the expansion chamber 12 is engaged to spray a solution, such as a binder solution, out of the single nozzles 16 on to the fluidized particles P. With the present invention, the single nozzles 16 can be positioned to cover substantially all of the cross-sectional area of the expansion chamber 12 with spray even adjacent to the side wall of the expansion chamber 12 as shown in the examples in FIGS. 3A and 3B. Additionally, since the single nozzles 16 can be positioned close together without substantial overlap, a higher spray rate can be used which increases the overall production throughput for the fluid bed processing system 10. Further, with each of the single nozzles 16 connected to a different fluid passage 36 in the spraying apparatus 14, the rate of spray from each single nozzle 16 can be optimized for the particular application.

As the fluidized particles P are wetted with solution from the spray apparatuses 14, the material M begins to descend back down to the lower part of the expansion chamber 12 due to its increased weight. As the particles P descend, the particles P dry and are blown back up in the expansion chamber 12 to be sprayed again to add another coating or to agglomerate more material together. The particles P continue to go through this up and down process until the particular processing is completed, e.g., a sufficient number of layers have been coated on the particles. During this process, the filter 62 is periodically shaken to release any particles P captured by the filter 62 back down towards the expansion chamber 12 and the product chamber 26.

Once the processing is completed, the spray apparatus 14 is turned off. Meanwhile, the fluid supply system 46 continues to supply fluid up into the product chamber 26 to dry the particles P. Once the enlarged particles P are dried, then the fluid supply system 46 is turned off.

The particles P accumulate in the product chamber 26 adjacent the side discharge mechanism 60 and discharge opening 56. The side discharge mechanism 60 is moved from the first position to the second or an intermediate position to at least partially expose or open the discharge opening 56. The rate of discharge can be controlled by controlling the size of the discharge opening 56 with the side discharge mechanism 60. Since the discharge opening 56 extends substantially around the product chamber 26, the particles P can be quickly and easily removed from the product chamber 26. Once all of the particles P have been discharged from the product chamber 26, the side discharge mechanism 60 is moved from the second or intermediate position to the first position to cover the discharge opening 56. The product chamber 26 is now ready to receive more particles P to start the next fluid bed processing application.

As this example illustrates, the spraying apparatuses 14 with the single nozzles 16 can be arranged to cover a large cross-sectional area of expansion chamber 12, including next to side wall 34 of expansion chamber 12. Additionally, with the separate fluid passages 36 for each single nozzle 16, greater control over the spray can be achieved. Further, the simplified design for the single nozzles 16 makes them easier to install and replace.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A fluid bed processing system for particles comprising:

an expansion chamber;

at least one spraying apparatus, at least a portion of the spraying apparatus extending into the expansion chamber; and a plurality of single nozzles spaced along the portion of the spraying apparatus that extends into the expansion chamber;

wherein the portion of said spraying apparatus that extends into the expansion chamber is substantially straight, has an elongated wand-shape, and comprises
a plurality of fluid passages, wherein each of the single nozzles is connected to a different one of the fluid passages, and
at least one gas passage connected to each of the single nozzles.

2. The fluid bed processing system as set forth in claim 1 wherein the single nozzles are each positioned to spray fluid from said fluid passages in a substantially vertical direction.

3. The fluid bed processing system as set forth in claim 1 wherein the spraying apparatus has a substantially elongated and straight shape.

4. The fluid bed processing system as set forth in claim 1 further comprising:

a product chamber connected to the expansion chamber, an opening connecting an interior of the product chamber to an interior of the expansion chamber;

a blower with an outlet connected to an inlet for the product chamber;

a screen extending between the outlet for the blower and the inlet for the product chamber; and a filter connected across an opening in the expansion chamber.

5. The fluid bed processing system of claim 1, wherein the single nozzles are each positioned to spray a second fluid in a substantially vertically downward direction.

6. The fluid bed processing system of claim 5, wherein said single nozzles are positioned to spray the second fluid onto a fluidized bed of particles fluidized in said expansion chamber and positioned about the expansion chamber to uniformly spray fluid onto fluidized particles without any significant spraying overlap.

7. The fluid bed processing system of claim 5, further comprising a source of binder solution in communication with said plurality of fluid passages for spraying said binder solution in a substantially vertically downward direction.

8. The fluid bed processing system of claim 1, further comprising a source of fluidizing fluid having a fluid flow direction that is substantially vertically upward for fluidizing particles into said expansion chamber and wherein the single nozzles are each positioned to spray fluid from said fluid passage in an substantially vertically downward direction.

9. The fluid bed processing system of claim 8, wherein a binder solution, coating fluid, or an agglomerating fluid is supplied to said fluid passages to be sprayed in a substantially vertically downward direction from said single nozzles.

10. The fluid bed processing system of claim 1, further comprising a product chamber having an open bottom and an open top, wherein said open top is in communication with said expansion chamber;

a source of fluidizing fluid;

a duct communicating said source of fluidizing fluid with said open bottom of said product chamber;

a screen located at the open bottom of said product chamber and through which fluidizing fluid from said source of fluidizing fluid can flow in a substantially vertically upward direction through particles disposed in said product chamber; and a source of binder solution, coating fluid, or agglomerating fluid in communication with said fluid passages, wherein the single nozzles are each positioned to spray fluid supplied from said respective fluid passage in a substantially vertically downward direction.

11. The fluid bed processing system of claim 1, further comprising a product chamber in communication with said expansion chamber, said product chamber for containing a bed of particles to be fluidized;

a source of fluidizing fluid flowing in an upward direction through the bottom of said product chamber and up into said expansion chamber; and wherein said single nozzles are positioned to direct a fluid supplied from said fluid passages in a downward direction.

12. A fluid bed processing system for particles comprising:

an expansion chamber;

at least one spraying apparatus having a spray housing that includes a main passage, at least a portion of the housing that includes the main passage extending into the expansion chamber;

a plurality of single nozzles spaced along the portion of the housing which extends into the expansion chamber;

a plurality of fluid passages located within the main passage, wherein each of the single nozzles is connected to a different one of the fluid passages; and at least one gas passage located within the main passage, wherein the at least one gas passage is connected to each of the single nozzles, and, in the portion of the housing that extends into the expansion chamber, the plurality of fluid passages and the gas passage are entirely located within the main passage.

13. The fluid bed processing system as set forth in claim 12, wherein the single nozzles are each positioned to spray fluid from said fluid passages substantially vertical direction.

14. The fluid bed processing system of claim 12, wherein the single nozzles are each positioned to spray a second fluid in a substantially vertically downward direction.

15. The fluid bed processing system of claim 12, further comprising a source of fluidizing fluid having a fluid flow direction that is substantially vertically upward for fluidizing particles into said expansion chamber and wherein the single nozzles are each positioned to spray fluid from a respective one of said fluid passages in an substantially vertically downward direction.

16. The fluid bed processing system of claim 15, wherein a binder solution, coating fluid, or an agglomerating fluid is supplied to said fluid passages to be sprayed in the substantially vertically downward direction from said single nozzles.

17. The fluid bed processing system of claim 12, further comprising a product chamber having an open bottom and an open top, wherein said open top is in communication with said expansion chamber;

a source of fluidizing fluid;

a duct communicating said source of fluidizing fluid with said open bottom of said product chamber;

a screen located at the open bottom of said product chamber and through which fluidizing fluid from said source of fluidizing fluid can flow in a substantially vertically upward direction through particles disposed in said product chamber; and a source of binder solution, coating fluid, or agglomerating fluid in communication with said fluid passages, wherein the single nozzles are each positioned to spray fluid supplied from a respective one of said fluid passages in a substantially vertically downward direction.

18. The fluid bed processing system of claim 12, further comprising a product chamber in communication with said expansion chamber, said product chamber for containing a bed of particles to be fluidized; and a source of fluidizing fluid flowing in an upward direction through the bottom of said product chamber and up into said expansion chamber;

wherein said single nozzles are positioned to direct a fluid supplied from said fluid passages in a downward direction.

* * * * *